United States Patent
Ahlers

(10) Patent No.: US 10,274,937 B2
(45) Date of Patent: Apr. 30, 2019

(54) OPERATING TERMINAL OF AN AGRICULTURAL MACHINE WITH HYPERVISOR SOFTWARE

(71) Applicant: AgBRAIN—Agritechnical Basic Research for Advanced Innovation GmbH, Osnabrück (DE)

(72) Inventor: Florian Ahlers, Osnabrück (DE)

(73) Assignee: AgBrain—Agritechnical Basic Research for Advanced Innovation GmbH, Osnabrück (DE)

( * ) Notice: Subject to any disclaimer, the term of this patent is extended or adjusted under 35 U.S.C. 154(b) by 262 days.

(21) Appl. No.: 15/115,664

(22) PCT Filed: Jan. 27, 2015

(86) PCT No.: PCT/EP2015/000141
§ 371 (c)(1),
(2) Date: Jul. 30, 2016

(87) PCT Pub. No.: WO2015/113752
PCT Pub. Date: Aug. 6, 2015

(65) Prior Publication Data
US 2017/0168476 A1 Jun. 15, 2017

(30) Foreign Application Priority Data

Jan. 31, 2014 (DE) .................. 10 2014 001 154

(51) Int. Cl.
*G05B 19/4155* (2006.01)
*G06F 9/455* (2018.01)
(Continued)

(52) U.S. Cl.
CPC .......... *G05B 19/4155* (2013.01); *A01B 63/00* (2013.01); *A01B 76/00* (2013.01);
(Continued)

(58) Field of Classification Search
None
See application file for complete search history.

(56) References Cited

U.S. PATENT DOCUMENTS

2008/0301673 A1* 12/2008 Kawasaki ........... G06F 9/45516
718/1
2011/0224873 A1 9/2011 Reeve et al.
(Continued)

FOREIGN PATENT DOCUMENTS

CN 101 292 282 A 10/2008
DE 20 2008 007912 U1 11/2008
(Continued)

*Primary Examiner* — Eric C Wai
(74) *Attorney, Agent, or Firm* — Gudrun E. Huckett

(57) ABSTRACT

The invention relates to an operating terminal (2) of an agricultural machine. The aim of the invention is to further develop the operating terminal. This is achieved in that hypervisor software (6) is installed onto the operating terminal (2), said software abstracting guest systems connected to the hypervisor software and the application software contained in the guest systems from the computer hardware (4). The software also regulates the communication between the guest systems and attributes computing time of the computer hardware (4) to the guest systems. The hypervisor software (6) is configured to have a system architecture consisting of the guest systems $G_2$ to Gn as the basis for the application software of the manufacturer of the operating terminal and/or driver for interfaces which are not to be provided to other partitions, Gx as the basis for security-critical application software, $G^y$ as the basis for other interfaces of drivers which are to allow the remaining guest systems, with the exception of the guest system Gx, access to different computer hardware and software interfaces, and $G_1$ for retrofitting and installing an additional complete guest system including the application software contained therein.

5 Claims, 1 Drawing Sheet

(51) Int. Cl.
*G06F 8/61* (2018.01)
*A01B 76/00* (2006.01)
*G05B 19/042* (2006.01)
*A01B 63/00* (2006.01)

(52) U.S. Cl.
CPC ........... *G05B 19/0426* (2013.01); *G06F 8/61* (2013.01); *G06F 9/45558* (2013.01); *G05B 2219/45017* (2013.01)

(56) References Cited

U.S. PATENT DOCUMENTS

| | | |
|---|---|---|
| 2012/0159469 A1 | 6/2012 | Laor |
| 2012/0209411 A1 | 8/2012 | Ohkado et al. |
| 2013/0150985 A1 | 6/2013 | Ohkado et al. |

FOREIGN PATENT DOCUMENTS

| | | |
|---|---|---|
| DE | 20 2012 006899 U1 | 10/2013 |
| JP | 2012 168755 A | 9/2012 |
| WO | 2007/027546 A2 | 3/2007 |

* cited by examiner

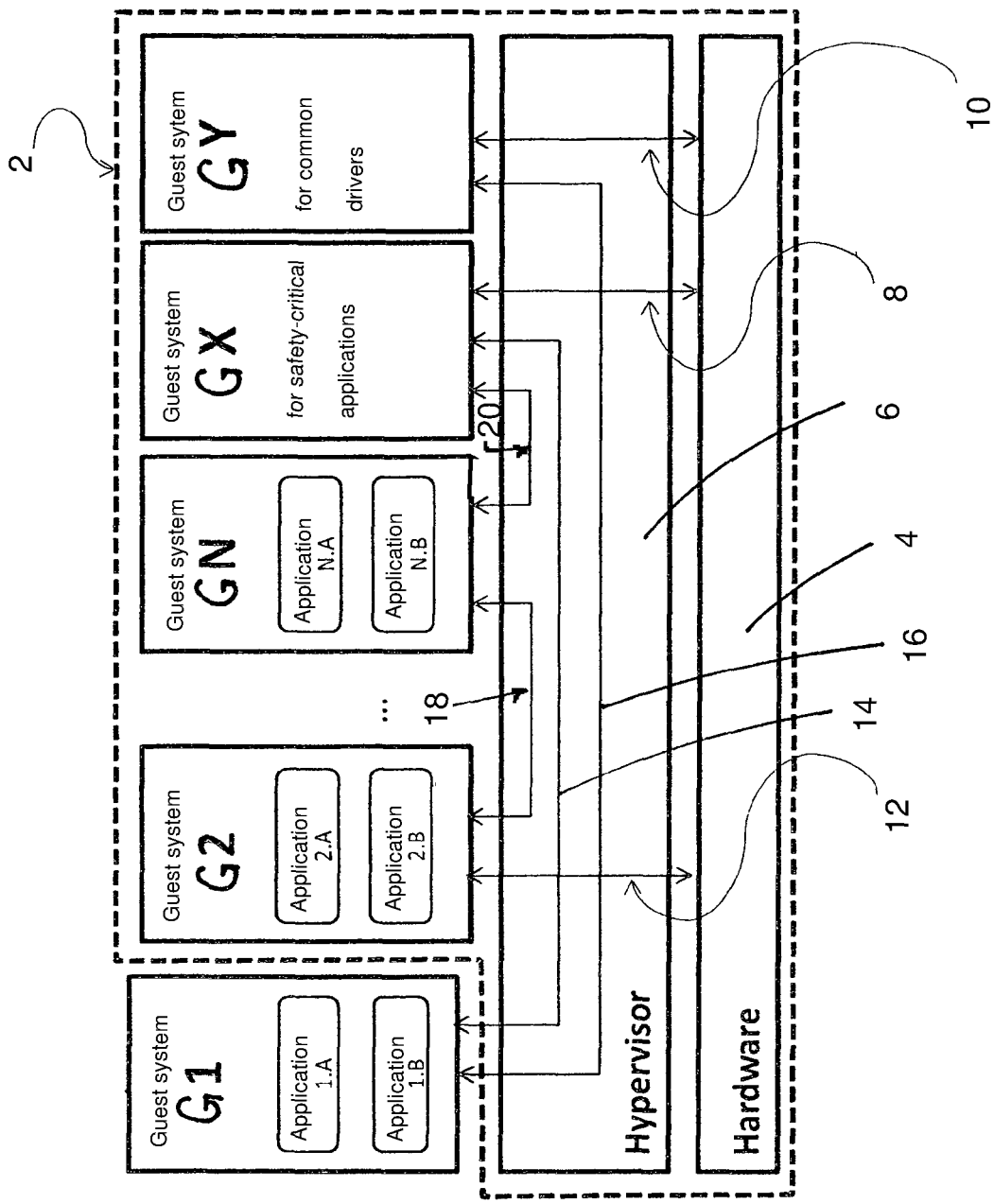

OPERATING TERMINAL OF AN AGRICULTURAL MACHINE WITH HYPERVISOR SOFTWARE

BACKGROUND OF THE INVENTION

The present invention concerns an operating terminal of an agricultural machine with computer hardware and computer software for operating the electrical and/or electronic functions of the connected agricultural machine.

Operating terminals of the aforementioned kind are disclosed, for example, in the publications DE 20 2008 007 912 and DE 20 2012 006 899. An operating terminal may be an agricultural terminal that is fixedly installed in a tractor or a self-propelled work machine or that is retrofitted into a driver's cabin for operating the tractor, the self-propelled work machine and/or an implement. The implement may be a towed agricultural machine, an agricultural attached implement, or an agricultural sensor. An operating terminal can be used for control of functions of a self-propelled work machine or a tractor as agricultural machines, or the operating terminal is used for controlling a different type of machine to be retrofitted to a tractor or carrier machine. The operating terminals are not only produced and programmed by manufacturers of self-propelled work machines or tractors but also by manufacturers of attached implements, for example, baling presses, mowing devices, turners, swathing devices, sowing devices, fertilizing and spraying devices, machines for working the soil, and the like so that, by means of the operating terminal and the application software installed therein, functions of the self-propelled work machine, a tractor, or an attached implement can be controlled.

In connection with agricultural machines there is the problem that frequently they can be operated optimally only by use of additional application software. The operating functions of this application software surpass the functional range that the software programs with application software, installed by the manufacturer in the operating terminal for operating the electrical and electronic basic functions of the respective agricultural machine, offer. The additionally required application software may concern the areas of logistics, documentation, business management optimization, or precalculation for configuration of the agricultural machine. Also, assisting application software such as chat, email or navigation programs are popular.

The operating terminals which are put on the market by the manufacturers usually are closed systems in regard to the computer software and only the software programs installed by the manufacturer can be run on them. A retrofitting installation of application software of external manufacturers that supplements the package of application software installed by the manufacturer is not possible, in particular for safety reasons. Accordingly, the utilizable functions of an operating terminal are limited to functions that the manufacturer has provided by installation of manufacturer's application software on the operating terminal. Accordingly, the possibility of expanding the functionality of the operating terminal for the customer by retrofitting installation of application software is not available. Accordingly, the agricultural machine cannot be operated with maximum efficiency and additional devices must be installed on the agricultural machine for running the corresponding application software when the desired function is to be utilized during operation of the agricultural machine. Therefore, it often happens that several operating devices are installed adjacent to each other in the driver's cabin of an agricultural machine, for example, adjacent to the operating terminal of the tractor manufacturer another operating terminal for an attached machine, a navigation device, and a data logger for documentation and accounting purposes, even though it would be possible to cover all functions with the hardware of a single operating terminal.

It is the object of the present invention to further develop the operating terminal such that it provides the possibility of retrofitting, installing, and running application software beyond the manufacturer's limits, beyond the configuration with computer software at the time of delivery, without the operating terminals being impaired with respect to the function predetermined by the manufacturer. A further object of the invention is to enable parallel operation and simultaneous execution of safety-critical and safety-uncritical application software on an operating terminal. A further object of the invention is finally to enable development and installation of application software substantially independent of the target platform, i.e., the concrete operating terminal, with the goal of fast and risk-free migration.

SUMMARY OF THE INVENTION

The object is solved for an operating terminal of the aforementioned kind in that on the operating terminal a hypervisor software is installed that abstracts the connected guest systems and the application software contained therein from the computer hardware, controls the communication between the guest systems, and allocates computing time of the computer hardware to the guest systems, wherein the hypervisor software in regard to its system architecture is configured for guest systems $G_2$ to $G_n$ as a basis for the application software of the manufacturer of the operating terminal and/or drivers for interfaces that are not to be made available to other partitions, $G_X$ as a basis for safety-critical application software, $G_Y$ as a basis for additional interface drivers which is to enable the other guest systems, with the exception of the guest system $G_X$, the access to different computer hardware and software interfaces, and $G_1$ for retrofitting and retro-installation of an additional complete guest system including the application software contained therein.

The hypervisor software is referred to by experts also as a virtual machine monitor, abbreviated VMM. A hypervisor refers to a class of systems of practical computer science which serves as an abstracting layer between actually existing hardware and an operating system possibly already installed on the system and additional operating systems to be installed. Such systems make it possible to define a virtual environment of the hardware resources, in particular of the CPU, the memory, the space on the hard disk, and/or the available periphery, that serves as a base for the installation of guest operating systems independent of the actually existing hardware. A hypervisor enables the operation of several guest systems on a host system. The hypervisor administers the resource allocation for the individual guest systems. It distributes the hardware resources in such a way that resources are available as needed for each individual guest operating system as if only one operating system were present. This can be done by hardware emulation, hardware virtualization, or paravirtualization. In this context, the hypervisor virtually creates for each individual guest system its own complete computer with all hardware elements such as the processor, drives, working memory etc.

With the system architecture according to the invention of a hypervisor software the objects of the invention are solved:

The guest systems $G_2$ to $G_N$, $G_X$ and $G_Y$ as well as the hypervisor and the hardware are provided by the manufacture of the operating terminal. A guest system is a complete operating system or a partition with greatly reduced application range.

The guest systems $G_2$ to $G_N$ serve as a basis for the application software of the manufacturer of the operating terminal as well as, where necessary, as drivers for interfaces that are not to be made available to other partitions but may exclusively be used by the respective guest system. The number of employed guest systems is up to the respective manufacturer.

The guest system $G_X$ serves as a basis for safety-critical application software and contains all required interface drivers for the safety-critical software applications. In general, this is at least one CAN bus driver which enables other guest systems access to the respective interface, in particular the CAN bus, by means of an interface. As needed, this can also be realized only within a limited range.

The guest system $G_Y$ serves as a basis for additional interface drivers which enable the other guest systems, with the exception of $G_X$, access to different hardware and software interfaces. This can be, for example, Ethernet, RS232, but also WLAN, LIN, and Bluetooth. The control of the display and of the touch screen would also be possible.

The architecture enables retrofitting/retro-installation of a complete guest system $G_1$ inclusive of the contained application software. For this purpose, it must provide a uniform interface for communication with the partitions $G_X$ and $G_Y$ by means of the hypervisor, inasmuch as the application software requires access to the respective hardware interfaces. Due to the secured separation of the guest systems $G_1$ to $G_N$, $G_X$, and $G_Y$ by means of the hypervisor with regard to memory and computing time, no application software of the guest system $G_1$, for example, the application 1.A, can disturb the execution of the application software of the operating terminal manufacturer, for example, the application 2.B.

The separation of safety-critical and safety-uncritical applications on a system is fulfilled as a result of the safe separation of the individual partitions by means of the hypervisor.

A substantial independence of the applications from the hardware is realized by the hypervisor. Accordingly, when exchanging the hardware, the hypervisor and, where necessary, the respective interface drivers in the guest systems must be adapted in essence.

In the configuration of the system architecture according to the invention, operating terminals can be supplemented in a simple way and without posing a risk to safety even by retrofitting with application software of manufacturers other than the manufacturer of the operating terminal. For example, the operating terminal preinstalled by the tractor manufacturer is provided with the hypervisor software and comprises the partitions $G_2$ to $G_N$, $G_X$, and $G_Y$. When the manufacturer of an attachable implement requires that, for optimal operation and utilization of his implement, additional application software, for example, the applications 1.A and 1.B, beyond the application software that is supplied by the tractor manufacturer be provided on this operating terminal, the implement manufacturer, when using the system architecture according to the invention on the operating terminal, has the possibility of offering the customer his application software on the operating terminal of the tractor manufacturer by retrofitting the guest system $G_1$ with the application software for the applications 1.A and 1.B, without the execution of the application software of the operating terminal originating from the tractor manufacturer being impaired. This is only possible so simply because no direct access of the guest systems installed on the operating terminal to hardware interfaces can occur but an abstraction by the guests systems $G_X$ and $G_Y$ is realized. For the software developer of the applications 1.A and 1.B it is thus inconsequential whether additional application software unknown to him is accessing the same interfaces. This is frequently the case in particular for the CAN interface in connection with ISOBUS-compatible application software in agricultural technology.

By use of the system architecture according to the invention with the secured separation between guest systems, the manufacturer of the operating terminal can simultaneously run safety-critical as well as safety-uncritical application software on the same operating terminal without having to suffer limitations with regard to safety. For example, an application software of the guest system $G_1$ with application 2.A shall be a chat application which enables the operator to receive messages from a central logistic site which coordinates the sequence of work in a fleet. At the same time, on the guest system $G_X$ an application software may be running that is classified and developed as safety-critical which, for example, monitors a mowing device that is attached to a tractor. A possible error in the chat application remains limited to the guest system $G_1$ and in the worst case can lead to complete failure of the guest system $G_1$ but without impairing monitoring of the mowing device in the guest system $G_X$.

When using the system architecture according to the invention, the manufacturer of an operating terminal can also exchange the hardware of the operating terminal quickly and with low risk for a new, more powerful or otherwise better suitable hardware. The development cycles for agricultural operating terminals become shorter and shorter in analogy to the existing trend in the consumer area. Up to now, an extreme expenditure is required by the manufacturer for migrating existing application software onto a new, more powerful, or for other reasons better suited, hardware. In view of this background, for the manufacturer of the operating terminal it is particularly important in regard to an exchange of the hardware to have to perform only little or no adaptations at all in regard to the application software in order to save in this way significant expenditures and thus costs. The use of the presented system architecture makes this possible and limits the adaptation expenditure to the hypervisor and, where necessary, the drivers for the hardware interfaces in the guest systems. The application software and the guest systems without direct access to the hardware interfaces, i.e., the guest systems $G_1$ and $G_3$ to $G_N$ must not be adapted in general.

According to one embodiment of the invention, the hypervisor software in its system architecture is configured for several guest systems $G_{1-1}$-$G_{1-N}$ for retrofitting and retro-installation of a respective additional complete guest system including the application software contained therein. Due to the configuration of the hypervisor software for retrofitting several guest systems, the flexibility and adaptability of the operating terminal in regard to different functional options desired by the customer increase.

According to an embodiment of the invention, the application software of the guest system $G_1$ has only an indirect access to the safety-critical functions of the hardware via the hypervisor and the guest system $G_X$. In this system architecture, at least via the application software of the retrofitted guest system $G_1$, no direct access to the hardware interfaces of the operating terminal is realized so that functional risks for safety-critical functions of the computer software installed by the manufacturer is precluded by means of an abstraction by the guest system $G_X$.

According to an embodiment of the invention, the application software of the guest system $G_1$ has only an indirect access to safety-uncritical interface drivers of the hardware via the hypervisor and the guest system $G_Y$. In this system architecture, at least by the application software of the retro-installed guest system $G_1$, no direct access to safety-uncritical interface drivers of the hardware of the operating terminal is realized so that here also functional risks for functions of the computer software installed by the manufacturer is precluded by means of the abstraction by the guest system $G_Y$.

According to an embodiment of the invention, the guest system $G_1$ is a control program for controlling an agricultural implement. By organization of the communication of a guest system G1 with the operating terminal by means of a hypervisor software, it is possible without safety risks for safety-critical functions to retro-install and operate the software for control of an agricultural implement on an existing operating terminal without this requiring installation of separate operating terminals in the driver's cabin.

It is expressly noted that the afore described advantageous embodiments each can be combined in any combination with the subject matter of the independent claim but also with other advantageous configurations, inasmuch as no technical obstacles stand in the way.

Further modifications and embodiments of the invention can be taken from the following subject matter description and the drawings.

The invention will be explained in more detail with the aid of an embodiment.

FIG. 1 shows an example of a system architecture according to the invention. The dashed line delimits the operating terminal 2 that is manufactured by the original manufacturer and delivered to customers. The operating terminal 2 comprises the computer hardware 4 which is installed therein and is illustrated in a simplified manner as a box, on which the hypervisor software 6 is implemented which is also illustrated in a simplified way as a box.

The operating terminal 2 comprises in the embodiment also the guest systems $G_2$-$G_N$ that form the basis for the application software of the manufacturer of the operating terminal 2 as well as, where necessary, as drivers for interfaces that are not to be made available to other partitions but may only be used exclusively by the respective guests system. The guest systems $G_2$ to $G_N$ can have access by means of path 12 to exclusive interfaces, for example, a special RS232 connector, as illustrated in the embodiment for the guest system $G_2$.

The guest system $G_1$ is a retrofitted guest system that contains application software for all additional applications that are required, or may only be advantageous, for operation and control of the machine connected with this guest system $G_1$. The guest system $G_1$ does not access directly the hardware 4 of the operating terminal 2, the access is realized only indirectly by means of the hypervisor 6 and the guest systems $G_X$ and $G_Y$ connected thereto and provided by the manufacturer of the operating terminal 2. In the embodiment, the guest system $G_X$ for safety-critical applications accesses directly through path 8 the hardware 4, for example, accesses a CAN bus as a component of the hardware 4, and the guest system $G_Y$ for common drivers accesses through path 10 the hardware 4, for example, for an access to other interfaces such as Ethernet, WLAN, or Bluetooth.

The function of the communication of the different guest systems with each other as well as the access to the hardware interfaces of other guest systems to the hardware 4 of the operating terminal 2 by means of hypervisor software 6 will be explained in more detail with the following examples.

The application A.1 in the guest system $G_1$ requires information/data from the CAN bus and wants to send itself information or data to the CAN bus. The communication of the application A.1 in the guest system $G_1$ with the CAN bus is realized by path 14 which is formed in the embodiment as a generic bidirectional communication interface to the hypervisor 6. This communication interface provides a direct connection, point to point, between the guest systems $G_1$ and $G_X$ on which exclusively CAN bus data are exchanged. For additional interfaces, for example, Ethernet, an additional generic communication interface would have to be realized in the same way, for example, by the path 16 from guest system $G_1$ to guest system $G_Y$.

In order to send data to the CAN bus, the application A.1 in the guest system $G_1$ first sends data to the generic interface on the hypervisor 6. The hypervisor 6 receives the data and communicates them through an interface to the guest system $G_X$. This communication path corresponds to path 14 in FIG. 1. The guest system $G_X$ receives the received data and communicates them on path 8 to the CAN bus driver which is a component of the hardware 4. The CAN bus driver itself then takes over the actual sending action of the data on the CAN bus.

Receipt of CAN bus data happens exactly opposite: The CAN bus driver of the hardware 4 receives the data from the CAN bus network and communicates them to the guest system $G_X$. The guest system $G_X$ communicates the data subsequently via the generic communication interface of the path 14 of the hypervisor 6 which, in turn, then communicates the data to the guest system $G_1$. In the guest system $G_1$ the CAN bus data are made available to the application A.1.

In order to avoid unnecessary load on the processor by the communication between the different guest systems $G_1$ and $G_X$ through the hypervisor 6, only the data that are required by application A.1 are communicated through the hypervisor 6. The application A.1 informs for this purpose the guest system $G_X$ of the required data in the form of an identification. In the context of ISOBUS communication, a meaningful identification is "parameter group number" (PGN) for which regulations are available in the standards ISO11783 and J1939. In this case, the guest system $G_X$ or the CAN bus driver would communicate only the requested, i.e., the needed, PGNs via the hypervisor 6 to the guest system $G_1$.

In analogy, the same concept also applies to the access of the guest system $G_X$ to other hardware interfaces. In particular the communication is possible in a similar way with an Ethernet-based network but requires system-based adaptations. Moreover, the access to hardware interfaces of the guest system $G_Y$ by applications of the guest system $G_1$ is realized in a similar way.

The communication explained herein by means of the hypervisor 6 between an application in the guest system $G_1$ with the CAN bus which is connected to the guest system $G_X$ functions also for applications of other guest systems that want to access the hardware 4 for safety-critical applications, for example, by path 20. Also, as needed, the communication by means of hypervisor 6 between different guest systems $G_2$-$G_N$ among each other can be realized by an appropriate path 18.

For analog hardware interfaces that are connected, for example, to guest system $G_Y$, they are first converted by the guest system $G_Y$ into digital values and interpreted. The interpreted values are then made available by means of a generic communication interfaces via the path 16 to the guest system $G_1$.

For certain data, a unidirectional communication interface may be sufficient. In this case, the guest system $G_Y$ communicates the data to a unidirectional hypervisor interface that can be read by several guest systems. In this way, several bidirectional communication interfaces via the hypervisor 6 are avoided and the data are efficiently made available to the guest systems.

The invention is not limited to the afore described embodiment. A person of skill in the art will have no problem in modifying the embodiment in a way that appears suitable in order to adapt it to a concrete application situation.

What is claimed is:

1. Operating terminal (2) of an agricultural machine with a computer hardware (4) and a computer software for operating the electrical and/or electronic functions of the connected agricultural machine, characterized in that on the operating terminal (2) a hypervisor software (6) is installed that abstracts guest systems connected thereto and the application software contained therein from the computer hardware (4), controls the communication between the guest systems, and allocates computing time of the computer hardware (4) to the guest systems, wherein the hypervisor software (6) comprises a system architecture configured for the guest systems including:
   first guest systems ($G_2$ to $G_n$) as a basis for the application software of the manufacturer of the operating terminal and/or drivers for interfaces that are not to be made available to other partitions,
   a second guest system ($G_X$) as a basis for safety-critical application software,
   a third guest system ($G_Y$) as a basis for additional interface drivers which is to enable the guest systems, with the exception of the second guest system ($G_X$), to access different computer hardware and software interfaces, and
   a fourth guest system ($G_1$) configured for retrofitting and retro-installation, wherein the fourth guest system ($G_1$) is an additional complete guest system including the application software contained therein.

2. Operating terminal (2) according to claim 1, characterized in that the system architecture of the hypervisor software (6) is configured for several of said fourth guest system ($G_{1-1}$-$G_{1-n}$).

3. Operating terminal (2) according to claim 1, characterized in that the application software of the fourth guest system ($G_1$) has an indirect access to the safety-critical functions of the hardware (4) only via the hypervisor (6) and the second guest system ($G_X$).

4. Operating terminal (2) according to claim 1, characterized in that the application software of the fourth guest system ($G_1$) has an indirect access to safety-uncritical interface drivers of the hardware (4) only via the hypervisor (6) and the third guest system ($G_Y$).

5. Operating terminal (2) according to claim 1, characterized in that the fourth guest system ($G_1$) is a control program for controlling an agricultural device.

* * * * *